(12) United States Patent
Mazzagatti

(10) Patent No.: US 7,734,571 B2
(45) Date of Patent: Jun. 8, 2010

(54) METHOD FOR PROCESSING SENSOR DATA WITHIN A PARTICLE STREAM BY A KSTORE

(75) Inventor: Jane Campbell Mazzagatti, Blue Bell, PA (US)

(73) Assignee: Unisys Corporation, Blue Bell, PA (US)

( * ) Notice: Subject to any disclaimer, the term of this patent is extended or adjusted under 35 U.S.C. 154(b) by 1034 days.

(21) Appl. No.: 11/384,947

(22) Filed: Mar. 20, 2006

(65) Prior Publication Data

US 2007/0220070 A1    Sep. 20, 2007

(51) Int. Cl.
G06F 17/00    (2006.01)

(52) U.S. Cl. .................. 707/102; 707/100; 707/101

(58) Field of Classification Search .......... 707/100–102
See application file for complete search history.

(56) References Cited

U.S. PATENT DOCUMENTS

| | | | |
|---|---|---|---|
| 4,286,330 A | 8/1981 | Isaacson |
| 5,245,337 A | 9/1993 | Bugajski |
| 5,293,164 A | 3/1994 | Bugajski |
| 5,592,667 A | 1/1997 | Bugajski |
| 5,630,125 A | 5/1997 | Zellweger |
| 5,634,133 A | 5/1997 | Kelley |
| 5,829,004 A | 10/1998 | Au |
| 5,894,311 A | 4/1999 | Jackson |
| 5,918,229 A | 6/1999 | Davis et al. |
| 5,930,805 A | 7/1999 | Marquis |
| 5,963,965 A | 10/1999 | Vogel |
| 5,966,709 A | 10/1999 | Zhang |
| 5,970,490 A | 10/1999 | Morgenstern |
| 5,978,794 A | 11/1999 | Agrawal et al. |
| 5,983,232 A | 11/1999 | Zhang |

(Continued)

FOREIGN PATENT DOCUMENTS

EP    0 079 465    1/1985

(Continued)

OTHER PUBLICATIONS

Gschia-Yuan Teng & David L. Neuhoff, "An Improved Hierarchical Lossless Text Compression Algrithm", Proceedings 1995 Data Compression Conference.

(Continued)

*Primary Examiner*—Sana Al-Hashemi
(74) *Attorney, Agent, or Firm*—Robert P. Marley; Richard J. Gregson

(57) ABSTRACT

A method for processing a particle stream in a KStore having a sensor level and a first level above the sensor level, including receiving a particle to provide a received particle and first determining a current K node to determine a partial sequence location. The method also includes second determining a match in accordance with the received particle and the current K node to provide a match determination and processing the current K node based upon the match determination. A new node is created if the second determining is negative. A current K node is set to the new node. A node count is incremented and a delimiter particle type of the received particle is determined. A match is determined between the delimiter and a Result node of an asCase node of the current K node to provide a delimiter match determination.

41 Claims, 10 Drawing Sheets

U.S. PATENT DOCUMENTS

| | | | |
|---|---|---|---|
| 6,018,734 A | 1/2000 | Zhang | |
| 6,029,170 A | 2/2000 | Garger | |
| 6,031,993 A | 2/2000 | Andrews et al. | |
| 6,102,958 A | 8/2000 | Meystel | |
| 6,115,715 A | 9/2000 | Traversat et al. | |
| 6,138,115 A | 10/2000 | Agrawal et al. | |
| 6,138,117 A | 10/2000 | Bayardo | |
| 6,144,962 A | 11/2000 | Weinberg et al. | |
| 6,160,549 A | 12/2000 | Touma et al. | |
| 6,233,575 B1 | 5/2001 | Agrawal et al. | |
| 6,275,817 B1 | 8/2001 | Reed et al. | |
| 6,278,987 B1 | 8/2001 | Reed et al. | |
| 6,286,002 B1 | 9/2001 | Axaopoulos et al. | |
| 6,341,281 B1 | 1/2002 | MacNicol et al. | |
| 6,356,902 B1 | 3/2002 | Tan et al. | |
| 6,360,224 B1 | 3/2002 | Chickering | |
| 6,373,484 B1 | 4/2002 | Orell et al. | |
| 6,381,600 B1 | 4/2002 | Lau | |
| 6,389,406 B1 | 5/2002 | Reed et al. | |
| 6,394,263 B1 | 5/2002 | McCrory | |
| 6,453,314 B1 | 9/2002 | Chan et al. | |
| 6,470,277 B1 | 10/2002 | Chin et al. | |
| 6,470,306 B1 * | 10/2002 | Pringle et al. | 704/3 |
| 6,470,344 B1 | 10/2002 | Kothuri et al. | |
| 6,473,757 B1 | 10/2002 | Garofalakis et al. | |
| 6,477,683 B1 | 11/2002 | Killian et al. | |
| 6,499,026 B1 | 12/2002 | Rivette et al. | |
| 6,505,184 B1 | 1/2003 | Reed et al. | |
| 6,505,205 B1 | 1/2003 | Kothuri et al. | |
| 6,581,063 B1 | 6/2003 | Kirkman | |
| 6,591,272 B1 | 7/2003 | Williams | |
| 6,604,114 B1 | 8/2003 | Toong et al. | |
| 6,615,202 B1 | 9/2003 | Ding et al. | |
| 6,624,762 B1 | 9/2003 | End, III | |
| 6,635,089 B1 | 10/2003 | Burkett et al. | |
| 6,662,185 B1 | 12/2003 | Stark et al. | |
| 6,681,225 B1 | 1/2004 | Uceda-Sosa et al. | |
| 6,684,207 B1 | 1/2004 | Greenfield et al. | |
| 6,691,109 B2 | 2/2004 | Bjornson et al. | |
| 6,704,729 B1 | 3/2004 | Klein et al. | |
| 6,711,585 B1 | 3/2004 | Copperman et al. | |
| 6,745,194 B2 | 6/2004 | Burrows | |
| 6,748,378 B1 | 6/2004 | Lavender et al. | |
| 6,751,622 B1 | 6/2004 | Puri et al. | |
| 6,760,720 B1 | 7/2004 | De Bellis | |
| 6,768,995 B2 | 7/2004 | Thier et al. | |
| 6,769,124 B1 | 7/2004 | Schoening et al. | |
| 6,799,184 B2 | 9/2004 | Bhatt et al. | |
| 6,804,688 B2 | 10/2004 | Kobayashi et al. | |
| 6,807,541 B2 | 10/2004 | Bender et al. | |
| 6,816,856 B2 | 11/2004 | Baskins et al. | |
| 6,826,556 B1 | 11/2004 | Miller et al. | |
| 6,831,668 B2 | 12/2004 | Cras et al. | |
| 6,868,414 B2 | 3/2005 | Khanna et al. | |
| 6,900,807 B1 | 5/2005 | Liongosari et al. | |
| 6,920,608 B1 | 7/2005 | Davis | |
| 6,931,401 B2 | 8/2005 | Gibson et al. | |
| 6,952,736 B1 | 10/2005 | Westbrook | |
| 6,965,892 B1 | 11/2005 | Uceda-Sosa et al. | |
| 7,027,052 B1 | 4/2006 | Thorn et al. | |
| 7,228,296 B2 | 6/2007 | Matsude | |
| 2002/0124003 A1 | 9/2002 | Rajasekaran et al. | |
| 2002/0138353 A1 | 9/2002 | Schreiber et al. | |
| 2002/0143735 A1 | 10/2002 | Ayi et al. | |
| 2002/0143783 A1 | 10/2002 | Bakalash et al. | |
| 2002/0188613 A1 | 12/2002 | Chakraborty et al. | |
| 2002/0194173 A1 | 12/2002 | Bjornson et al. | |
| 2003/0009443 A1 | 1/2003 | Yatviskiy | |
| 2003/0033279 A1 | 2/2003 | Gibson et al. | |
| 2003/0093424 A1 | 5/2003 | Chun et al. | |
| 2003/0115176 A1 | 6/2003 | Bobroff et al. | |
| 2003/0120651 A1 | 6/2003 | Bernstein | |
| 2003/0204513 A1 | 10/2003 | Bumbulis | |
| 2003/0204515 A1 | 10/2003 | Shadmon et al. | |
| 2003/0217335 A1 | 11/2003 | Chung et al. | |
| 2004/0107186 A1 | 6/2004 | Najork et al. | |
| 2004/0133579 A1 * | 7/2004 | Campbell | 707/100 |
| 2004/0133590 A1 | 7/2004 | Henderson et al. | |
| 2004/0143571 A1 | 7/2004 | Bjornson et al. | |
| 2004/0169654 A1 | 9/2004 | Walker et al. | |
| 2004/0230560 A1 | 11/2004 | Elza et al. | |
| 2004/0249781 A1 | 12/2004 | Anderson | |
| 2005/0015383 A1 | 1/2005 | Harjanto | |
| 2005/0050054 A1 | 3/2005 | Clark et al. | |
| 2005/0060325 A1 | 3/2005 | Bakalash et al. | |
| 2005/0071370 A1 | 3/2005 | Altschul et al. | |
| 2005/0080800 A1 | 4/2005 | Parupudi et al. | |
| 2005/0097108 A1 | 5/2005 | Wang et al. | |
| 2005/0102294 A1 | 5/2005 | Coldewey | |
| 2005/0149503 A1 | 7/2005 | Raghavachari | |
| 2005/0171960 A1 | 8/2005 | Lomet | |
| 2005/0179684 A1 | 8/2005 | Wallace | |
| 2005/0198042 A1 | 9/2005 | Davis | |
| 2005/0262108 A1 | 11/2005 | Gupta | |

FOREIGN PATENT DOCUMENTS

| | | |
|---|---|---|
| WO | WO 95/17783 | 6/1995 |
| WO | WO 99/34307 | 7/1999 |
| WO | WO 01/46834 | 6/2001 |
| WO | WO 02/063498 | 8/2002 |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

Burton F. W. et al:"Multiple Generation Text Files Using Overlaping Tree Structures", Computer Journal, Oxford University Press, Surrey, GB. vol. 28, No. 4 Aug. 1985, pp. 414-416.

\* cited by examiner

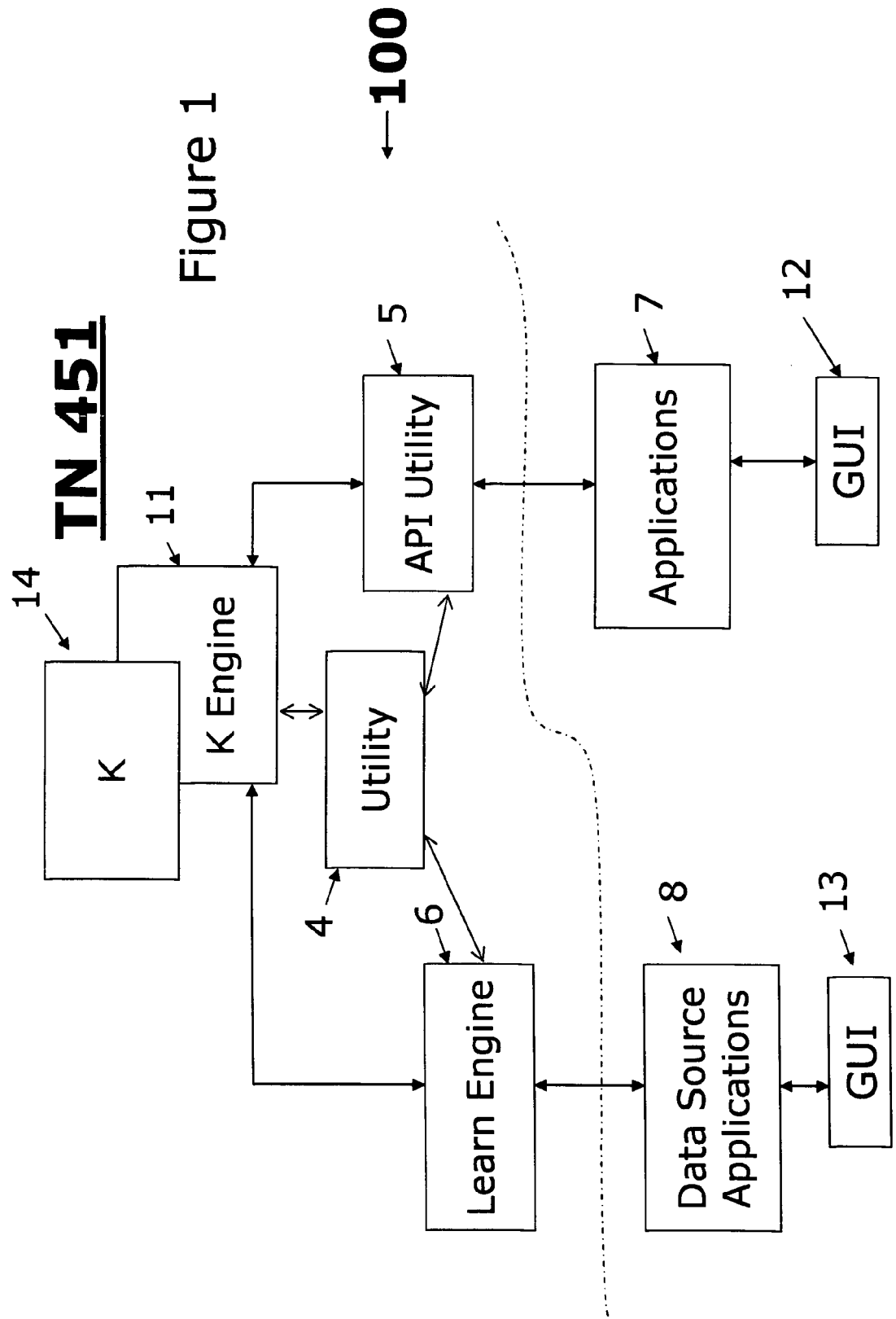

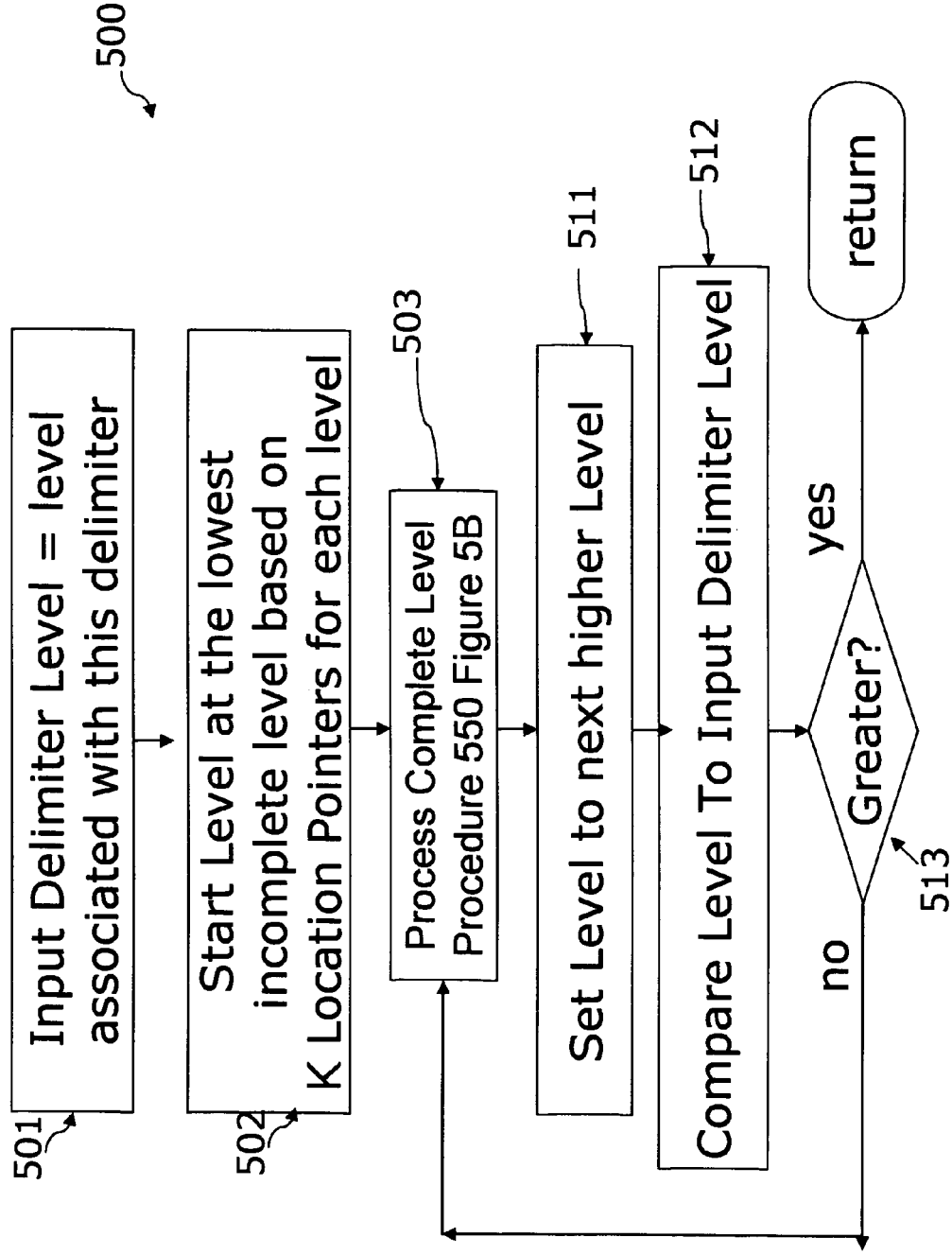

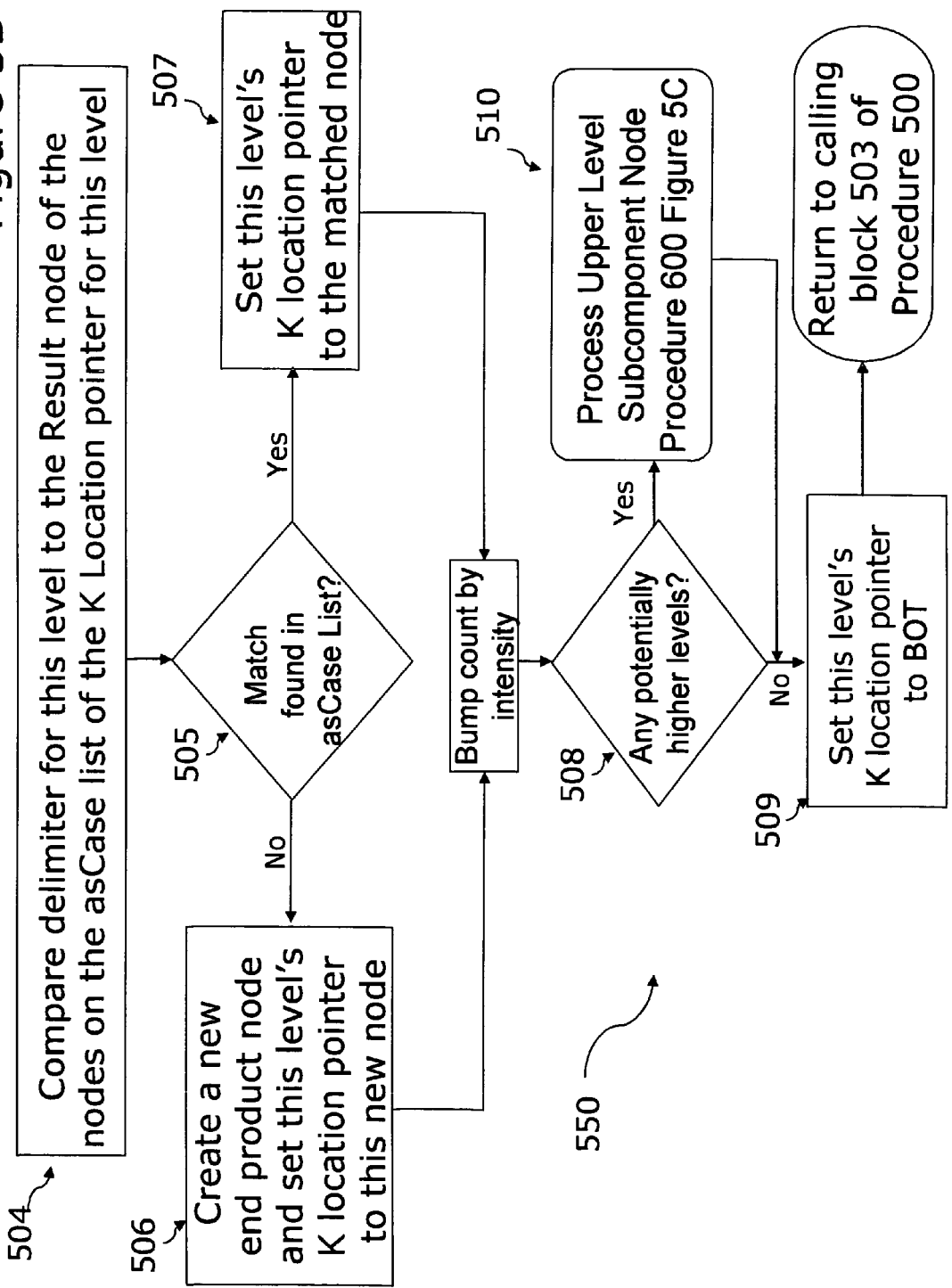

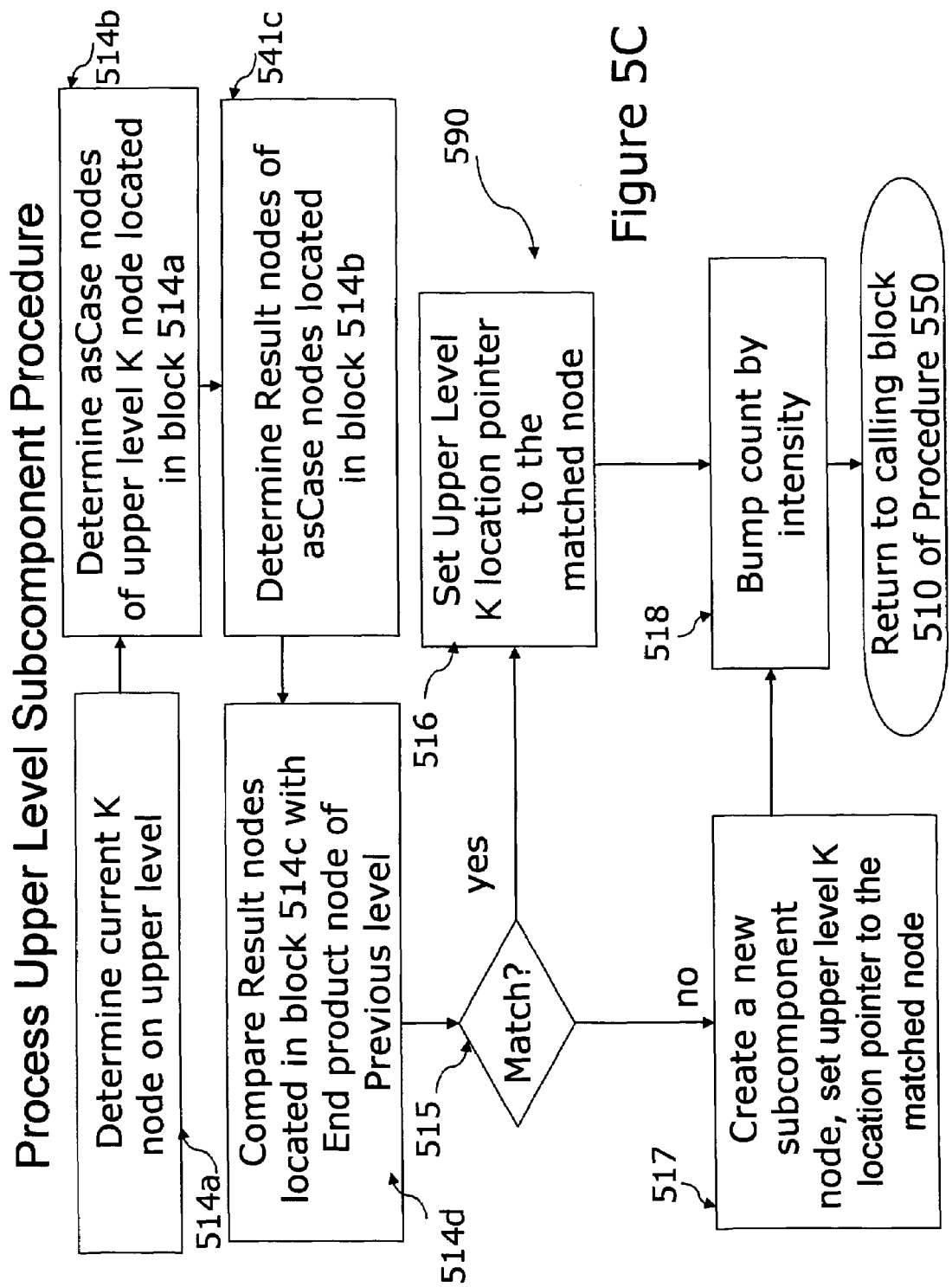

METHOD FOR PROCESSING SENSOR DATA WITHIN A PARTICLE STREAM BY A KSTORE

BACKGROUND OF THE INVENTION

1. Field of Invention

This invention relates to computing and, in particular to the field of database storage technology and the field of interlocking trees data stores

2. Description of Related Art

While interlocking trees datastores are covered in other patents by inventor Mazzagatti, it may be useful to provide a brief background summary of KStore and various features of said interlocking trees datastores.

A system and various methods for creating and using interlocking trees datastores and various features of the interlocking trees datastores have been developed. We refer to an instantiation of these interlocking trees datastores that we have developed as a KStore or just K. In particular, these structures and methods have been described in U.S. Pat. No. 6,961,733 and patent application Ser. No. 10/666,382, (now published as 20050076011A1) by inventor Mazzagatti. Additionally, we described a system in which such interlocking trees datastores could more effectively be used in U.S. Ser. No. 11/185,620, entitled "Method for Processing New Sequences Being Recorded into an Interlocking Trees Datastore." This invention provides the process invented to build and access the structure.

In U.S. Pat. No. 6,961,733 and U.S. Ser. No. 10/666,382, (now published as 50050076011), also by inventor Mazzagatti, we explained some preferred methods used to build and access an interlocking trees datastore. The methods taught in both of these patents were written at a level that taught the methodology of how an interlocking trees datastore is built and accessed.

All references cited herein are incorporated herein by reference in their entireties.

BRIEF SUMMARY OF THE INVENTION

A method for processing a particle stream in a KStore having a sensor level of elemental root nodes and a first level above the sensor level, the particle stream having a plurality of input particles, including receiving at least one particle within the particle stream to provide a received particle and first determining a current K node to determine a partial sequence location. The method also includes second determining a match in accordance with the received particle and the current K node to provide a match determination and processing the current K node based upon the match determination. A new node is created if the second determining is negative. A current K node is set to the new node. A node count is incremented and a particle type of the received particle is determined. The particle type is determined to be a delimiter. A match is determined between the delimiter and a Result node of an asCase node of the current K node to provide a delimiter match determination. An end product node is built if the delimiter match determination is negative. The current K node is set to a sequence beginning location. The sequence beginning location can be a beginning of thought location. The current K node is set to beginning of sequence if the delimiter match determination is positive.

The process used to create and access a K structure herein utilizes a procedure, which is called the praxis procedure. The praxis procedure can receive individual particles of incoming data, determine the type of particle and, based on the sensors and delimiters, access and construct the multiple levels of an interlocking trees datastore.

The KEngine creates and accesses a K structure from a stream of particles. Some of the particles in the particle stream may be identified as delimiters. Delimiters can be indicators that a portion of the particle stream is a complete thought. As an example, a white space between characters in printed text indicates that one word is ending and another is beginning. The KEngine is required to recognize the delimiters and create K structure to record the represented data. Furthermore, the KEngine is designed to recognize and process particles as either delimiters or sensors. If a particle cannot be identified as either a delimiter or a sensor it can be ignored as noise.

Sensor particles are processed by the KEngine as extensions of a current sequence of events. If there is structure that has previously recorded the sequence, the K can be traversed to reposition the current K location pointer. If there is no previous structure recording the sequence, new K structure can be created to record the event.

While the KEngine is processing the particle stream some particles are recognized as ending a sequence and beginning a new sequence. For example, within the field record universe the particle stream is divided into fields and groups of fields are divided into records. A common method of identifying the end of one field and the beginning of the next is to insert a particle, such as a comma, into the stream to indicate the limits of the field and a different character, such as a semicolon, to indicate the limits of a record.

When the KEngine recognizes a comma particle, an EOT node can be appended to the current K path being created at a first level above the sensors, thereby completing a field entry. A new path beginning with the BOT node can then be established as the current K path for a further field entry. Particle processing then continues.

When the KEngine recognizes a semicolon particle, an EOT node can be appended to the current K path being created at the level above the field variable level. This can complete a record entry. A new K path beginning with the BOT node can be established as the current path for a record entry. In addition, the K path at the field variable below the record level can be completed and particle processing continues.

BRIEF DESCRIPTION OF SEVERAL VIEWS OF THE DRAWINGS

The invention will be described in conjunction with the following drawings in which like reference numerals designate like elements and wherein:

FIG. 1 shows a block diagram representation of the main components which can be used with the present invention.

FIG. 5A is a flowchart representation of a procedure for processing a delimiter.

FIG. 5B is a flowchart representation of a procedure for processing a delimiter indicating a complete level of a K structure.

FIG. 5C is a flowchart representation of a procedure for processing a delimiter and creating and accessing upper level subcomponent nodes.

DETAILED DESCRIPTION OF THE INVENTION

Figure 2A:
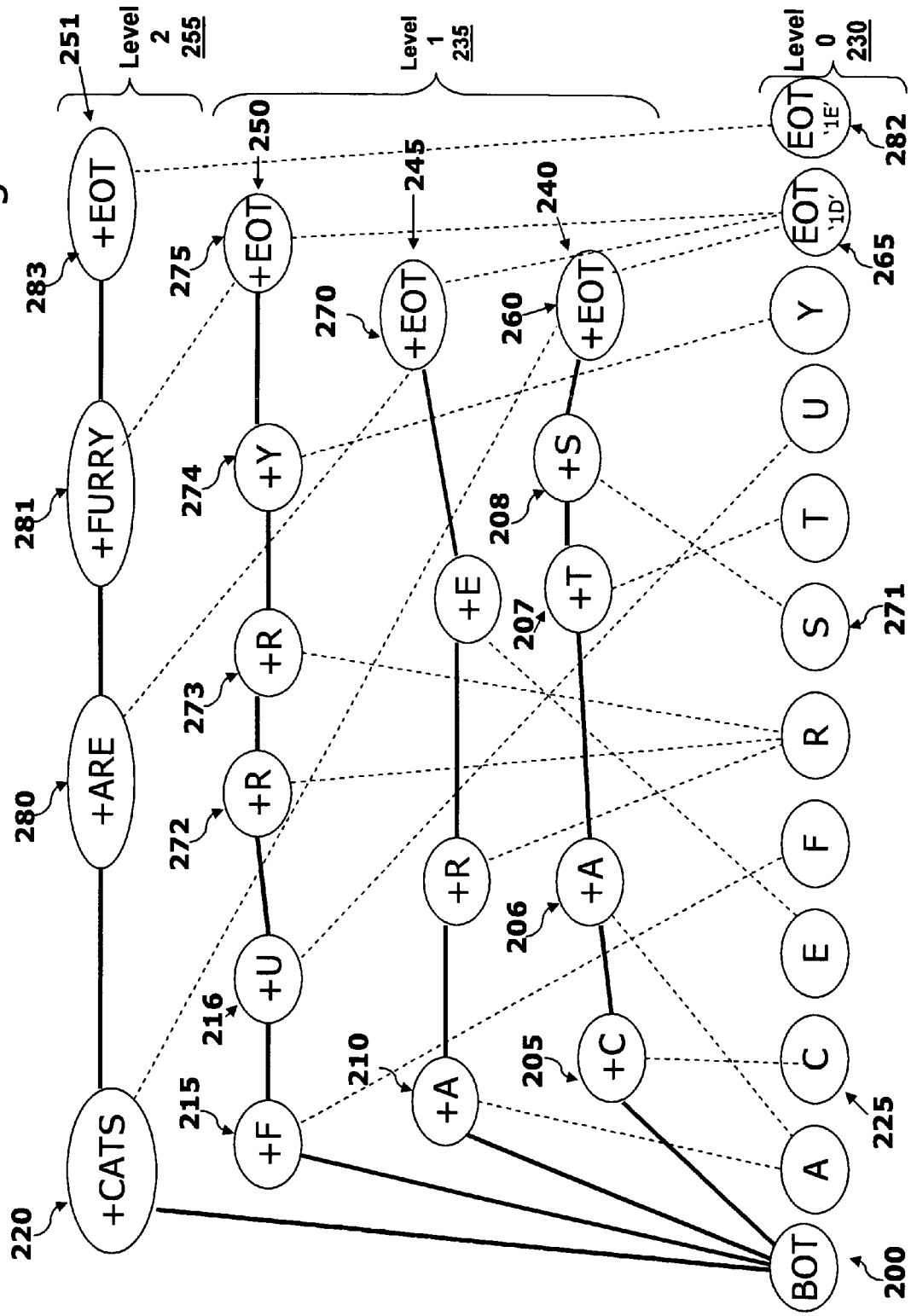
FIG. 2A is a graphical representation of an interlocking trees datastore showing a structure representing the words CATS ARE FURRY.

Referring now to FIG. 1, there is shown a block diagram representation 100 of a KStore environment in which the system and method of the present invention can be implemented. Within such a KStore environment, information can flow bi-directionally between the KStore 14 and the remainder of the system through the K Engine 11. The transmission of information to the K Engine 11 may be by way of a learn engine 6 and the data source 8. The transmission of information may be by way of an API utility 5 and the application 7 as also understood by those skilled in the art. Providing graphical user interfaces 13, 12 to data source 8 and the application 7 can thus permit an interactive user to communicate with the system.

The KEngine

The K Engine 11 receives a particle from somewhere outside the K engine 11 and creates or accesses the K structure 14. The K structure 14 contains elemental nodes that represent recognized particles of data. FIG. 2A is a graphical representation of an interlocking trees datastore having the K structure for representing CATS ARE FURRY. The graphical representation of FIG. 2A is used throughout this patent as an exemplary K structure for illustrative purposes.

Also represented within the K structure are the relationships that exist between the nodes. Each node in the K structure that is constructed can be assigned an address in memory. Additionally, each node can contain two pointers, a Case pointer and a Result pointer. The case pointer and the Result pointer of a node point to the two nodes from which it is formed. Also contained in a K node may be pointers to two pointer arrays, the asCase and the asResult array. The asCase array can contain pointers to the nodes whose Case pointers point to the K node. The asResult array, which contains pointers to the nodes whose Result pointers point to the K node. How the individual K nodes within a structure are constructed and accessed is the subject of numerous references by Mazzagatti, including U.S. Pat. No. 6,961,733.

Data Particles

As mentioned above, data passed from the learn engine 6, the utilities 4 or the API utilities 5 to the K Engine 11 are particlized. For example, each word in a sentence may be treated as an individual particle of data, or each letter in a word can be treated as an individual particle of data. For example, in a textual data stream containing the words CATS ARE FURRY, the individual word CATS can be a particle, which can be sensed by a word particle sensor. Additionally, the word ARE and the word FURRY are particles which can be sensed by word particle sensors.

Each character or letter in a word, such as CAT, can be considered to be a particle which can be sensed by a sensor, in this case a character particle sensor (i.e., C is a particle of CAT as is A and T). Each of these may be a particle of data in a field/record textual universe of data. By textual it is meant that data are made up of alphanumeric characters (e.g. the letters A through Z), special characters (e.g. punctuation) and numeric data (e.g. numbers). The term field/record is a carry over from traditional database terminology, wherein a field represents the title of a column in a table and a record represents the rows within the table and contains the actual data.

However, textual data is not the only type of data that can be streamed by the learn engine 6, utility 4 or API utility 5 into the K Engine 11. Those skilled in the art will understand that any kind of data that can be digitized can be particlized and streamed into K. For example, if the data universe is image data, the particles that can be digitized can be pixels. If the data universe is auditory data, the particles can be digitized sound waves. If the data universe is pressure data, particles can be digitized pressure values. If the data universe is olfactory data, particles can be digitized chemical molecules representing odors.

In many of the explanations that follow, the examples use data from the field/record universe. This means that in the examples, it is assumed that the data which is learned or accessed within K can come from traditional tabular databases or other traditional data structures in the form of text, numbers and special characters arranged in fields within records. But, it should be remembered that any type of data from any source that can be digitized can be learned and accessed within a K and therefore could have been used in the examples that follow. Also, the K structure can contain more than two levels of structure. As well, in the following, a KStore node diagram, as shown in FIG. 2A, is used to illustrate an interlocking trees datastore depicting the creation of the words +CATS, +ARE and +FURRY and the sentence CATS ARE FURRY.

Generating an Interlocking Trees Datastore (K) from Particlized Data

As taught in U.S. Pat. No. 6,961,733 and illustrated in FIG. 1 herein, an exemplary system 100 for generating the interlocking trees datastore 14 in one embodiment can include the K Engine 11. The K Engine 11 can receive particles of data from a data stream from the learn engine 6, from the API utility 5 or from any other utility 4. The K Engine 11 is designed to recognize and process particles of data that it receives. Note that some of the particles can be created and used strictly within the K Engine 11. For example, BOT, end of list (EOL), end of record (EOR) or end of identity (EOI) can be elemental nodes. In the current embodiment there are three types of particles that the K Engine can recognize: sensors, delimiters, and unidentified particles.

Praxis Procedure

Figure 3:
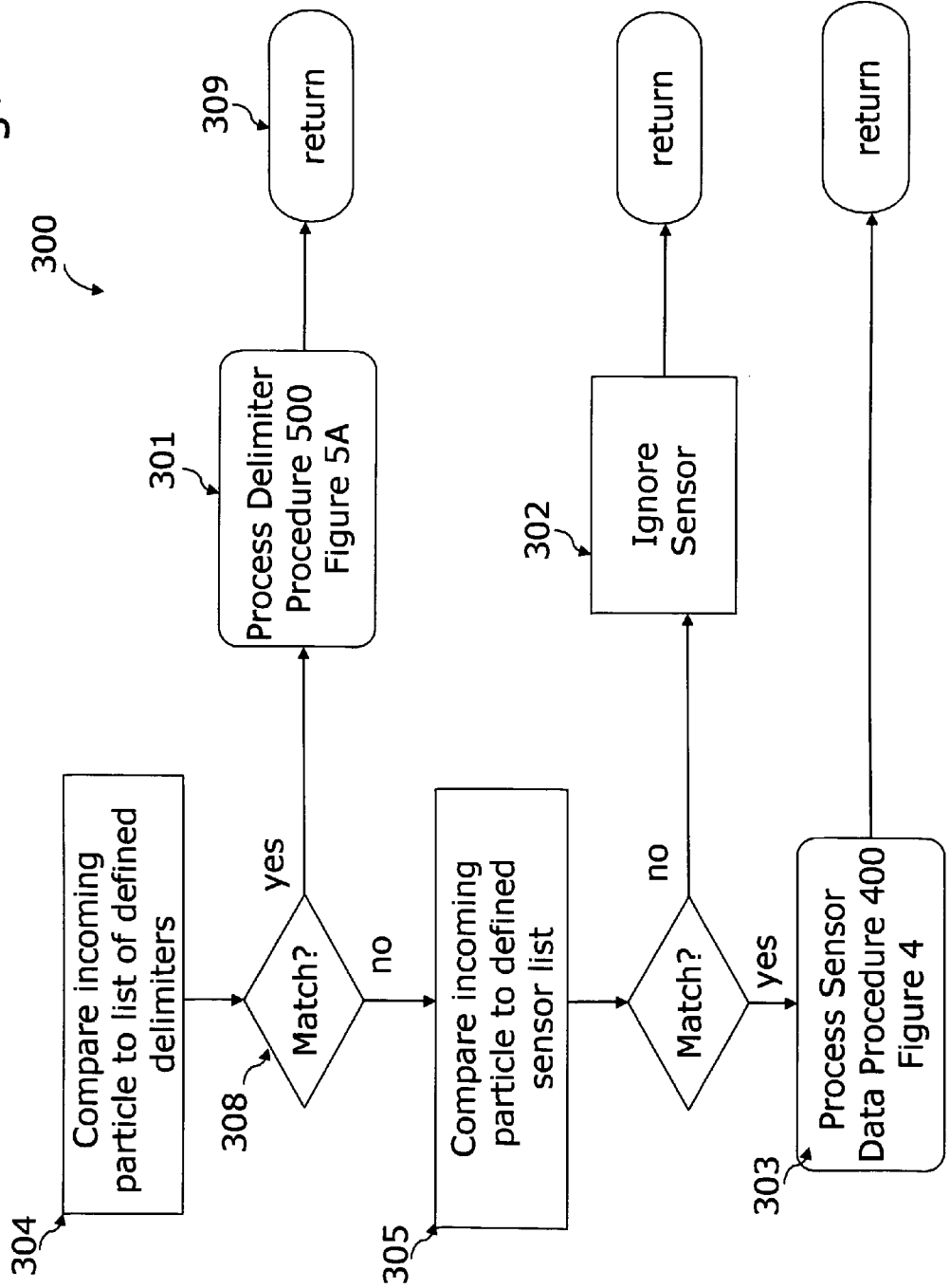
FIG. 3 is a flowchart representation of a praxis procedure, which is a process that can match incoming particles of data with lists of delimiters, sensory data, and unidentified particles.

A procedure that can recognize particles of sensor data, delimiters or unidentified particles according to the system and method of the invention can be the praxis procedure. FIG. 3 shows a flowchart representation of a portion of the praxis procedure 300 which can be used for recognizing input particles in the system of the present invention. In the current embodiment, there can be three procedures corresponding to the three types of particles that may be received as input during the praxis procedure 300: (1) a procedure for processing a delimiter 301, (2) a procedure for processing unidentified particles (ignore sensor) 302 and (3) a procedure for processing sensor data 303. The following teaches the praxis procedure 300 in a preferred embodiment with special emphasis on how delimiters are processed and used to build and access an interlocking trees datastore consisting of multiple levels of K structure and how K location pointers or state are utilized.

Sensor Data, Delimiters, and Unidentified Particles

Before teaching in detail how sensor data, delimiters and unidentified particles are processed, it is necessary to explain what each of the three types of particles includes.

Sensor Data

A sensor can be any digitized data. A sensor is maintained within the K structure as an elemental root node. The elemental root nodes representing sensors may contain or point to values that match the digitized value of the sensor. In a field/record data universe, sensor data may include, but is not limited to, alphanumeric characters. The alphanumeric characters can include the letters in the alphabet, numbers and special characters such as punctuation and other special characters. Depending on how a system is configured a particle of sensor data may include only single letters, numbers, or characters, or they may be whole words, phrases, sentences, paragraphs, chapters, or even entire books, etc. Furthermore, particles may include pixel values forming images of single letters or images of any other type. Thus, as mentioned above, data particles are not limited to textual data and may consist of any other forms of digitized data (e.g. pixels forming other images, sound waves, etc.).

Delimiters

Delimiters are particles that are used to identify an ending of a set of sensors. Furthermore, delimiters may be used to group sensor sets into hierarchies. For instance in a field/record universe, sets of letters may be grouped into words by delimiters. The words can then be grouped into field names or field values by delimiters. The field names or field values can be further grouped into fields and then into records.

Delimiters may be equivalent to individual sensors or sets of sensors. Or they may contain different values altogether. In the current embodiment, delimiters may include alphanumeric characters such as the letters of the alphabet, special characters such as, but not limited to, commas (,), semicolons (;), periods (.), and blanks ( ). Numbers in any base systems may also be used as delimiters. For example, in the current embodiment hexadecimal (base 16) numbers may be used as delimiters. However, as mentioned above, because particles are not limited to characters in the textual field/record universe, delimiters may also be any different type of digitized particle. For example, in a universe of digitized pixels, a single pixel or group of pixels may be used as a delimiter.

Unidentified Particles

Unidentified particles are any particles other than the ones that a current set of particle sensors and delimiter sensors recognizes. Unidentified particles, often called noise, may be, for example, particles of data from a different data character set (e.g. an Arabic or Chinese character). They may be particles from a different data universe, or they may just be an unprintable character that is not in the current set of sensors or delimiters.

Determining Particle Types

Refer back to FIG. 3. As taught above, the praxis procedure 300 can determine the particle type of an incoming particle received by a K Engine within a K system such as the K system 100. Based on the type of particle determined, the praxis procedure 300 can initiate one of three processes to process delimiters, sensor data or unidentified particles.

Comparing Particles to Delimiter List

In the praxis procedure 300 a particle of incoming data can be compared to a currently defined list of delimiters as shown in block 304. If the input particle matches an entry in the currently defined list of delimiters a process delimiter procedure is performed as shown in block 301. A process delimiter procedure that can be performed when a particle is determined to be a delimiter according to block 301 is taught below as the process delimiter procedure 500 in FIG. 5A.

Comparing Particles to Sensor List

If the input particle does not match any of the current delimiters as determined according to the comparison of block 304 the praxis procedure 300 can continue to block 305. At block 305 the praxis procedure 300 can compare the incoming particle to a currently defined list of sensors.

The example in the following discussion uses the letter C as an exemplary particle of data from a textual field/record universe. Assume that in the example the letter C does not match any delimiter in the current set of delimiters and execution of the praxis procedure 300 proceeds to block 305. The praxis procedure 300 can then attempt to match the particle C with a list of current sensors in block 305. As taught in the above mentioned patents, in the current embodiment sensors can be maintained in the K structure as elemental root nodes. Lists of these elemental root nodes can be stored in arrays, hash tables, within the K 14 or a separate K structure or in any other manner understood in those skilled in the art.

For example, refer back to the exemplary structure shown in FIG. 2A, which is a graphical representation of an exemplary interlocking trees datastore. The exemplary interlocking trees datastore includes structure representing the exemplary record CATS ARE FURRY. In this example, a particle C is found, for example, in a sensor array (not shown). Since there is a match, the praxis procedure 300 saves the location of the elemental root node for the C particle to a variable to be used later. In this example, the location which is saved is location 225, as shown in FIG. 2A.

It should be mentioned here that if the particle does not match anything in the sensor list, the ignore sensor process can be performed as shown in block 302 of FIG. 3. The ignore sensor process may choose to discard any particle that is not recognized as a current sensor or delimiter, thereby treating it as noise. One skilled in the art will recognize that these discarded particles may be handled in numerous ways including notifying users via error or log files where other processes may be performed or users may review the contents. Additionally, an error condition may be detected in a particle sequence being received by a KStore. In one embodiment of the invention a procedure may be initiated to set the current K pointers to BOT. Under these circumstances the KStore can, for example, await a valid sequence. In a preferred embodiment of the invention the receipt of a null character can be used to indicate that the current K nodes should be reset. If the incoming particle matches something on the sensor list, the procedure of process sensor data block 303 is initiated.

Processing Sensor Data

Figure 4:
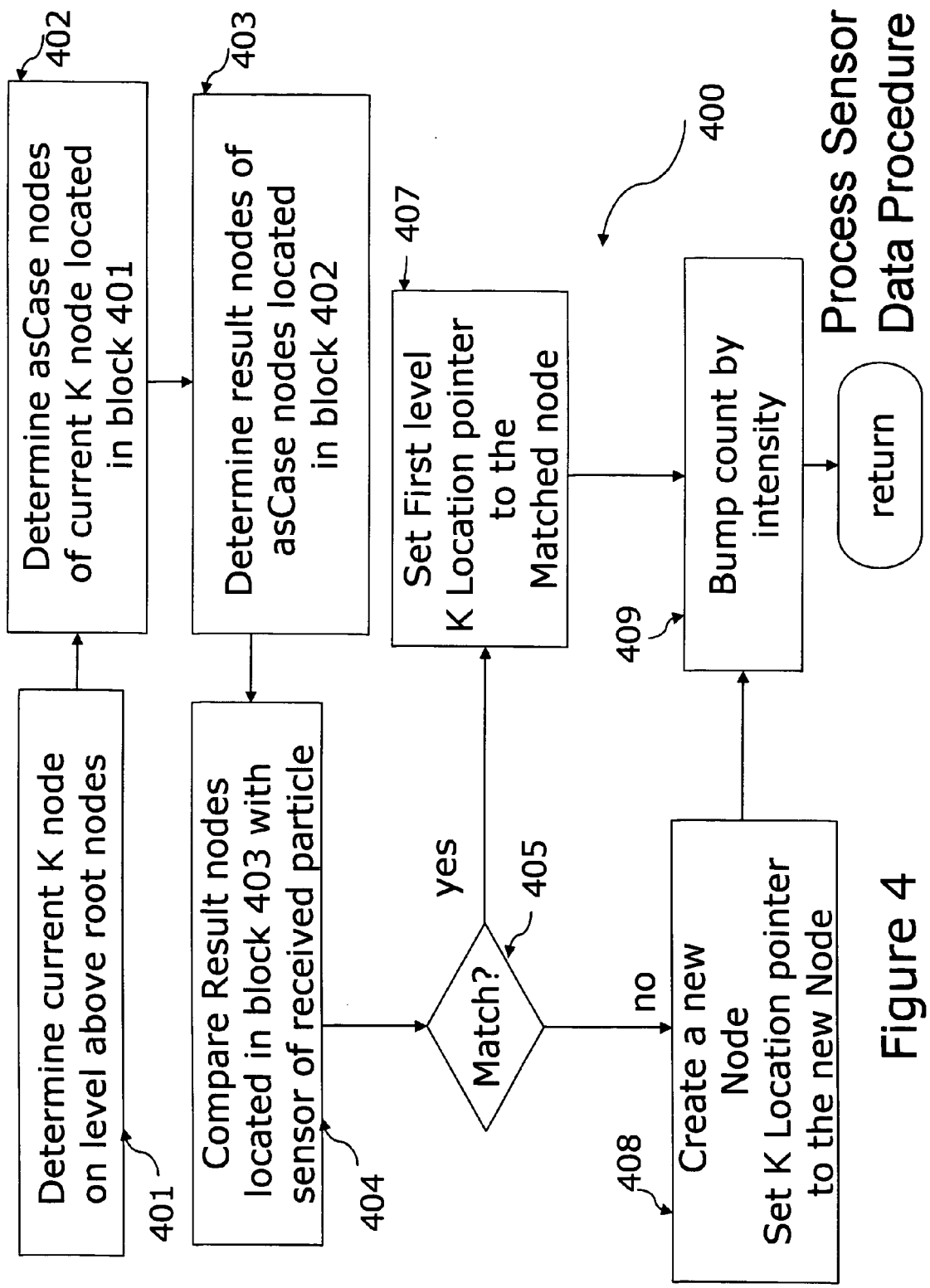
FIG. 4 is a flowchart representation of a procedure for building and accessing a K structure from individual incoming particles of sensed data.

Refer to FIG. 4, which is a flowchart representation of a process sensor data procedure 400 according to the present invention. The process sensor data procedure 400 is suitable for processing sensor data to build or access a K structure according to an incoming particle of sensory data. Initiation of the process sensor data procedure 400 can occur pursuant to execution of the process sensor data block 303 within the praxis procedure 300, when an input particle does not match any entries in the current set of delimiters but does match an entry in the current set of sensors.

As shown in block 401 of the process sensor data procedure 400, the current K node on the current level of the K structure is determined, wherein terms such as "current K node," "current K location" and "current K pointer" are understood to refer to the location of the last experience on a selected level. When block 401 is executed the incoming particle has just been matched with the root node corresponding to the incoming particle according to block 305 of the praxis procedure 300. Therefore, the current level is known to be the level above the elemental root nodes. Accordingly, the current K node of the level above the root nodes is determined in block 401.

In a preferred embodiment of the invention, a list or any other kind of structure, can be maintained to store state variables indicating the current K location corresponding to each level. For example, in the case of a multilevel K structure an array setting forth the correspondence between each level of the K structure and a variable indicating the current node of the level can be provided. The current K locations, or the current K node state data, of the levels of the K are known and stored according to the last event experienced on each level. The array or other data structure storing the current K node state data can be referred to as a state array or state table.

In one preferred embodiment each K location pointer can be used to identify both the current K level and the position on the current K level where the last event was experienced. Additionally, the foregoing structure for storing the correspondence between each level of the K structure and its current K node location pointer can store a list of the current set of delimiters, wherein the delimiters are described above with respect to block 304 of the praxis procedure 300 and in further detail below. However, the delimiter level data can be stored in any manner known to those skilled in the art. The structure may also contain a set of sensors appropriate for that particular level. The array of other data structure storing the current K state can be referred to as the state array or state table.

Furthermore, a correspondence between the defined delimiters and the levels of the K structure can be stored. Storage of this information permits the system to determine a relationship between an input delimiter and a level of the K structure that is being ended by the delimiter. It will be understood that the current K node state data and the delimiter level information do not need to be stored in the same data structure. It will also be understood that multiple delimiters may be appropriate for a single level.

As shown in block 402, the process sensor data procedure 400 can then determine the adjacent nodes of the current K node that was determined in block 401. As well known to those skilled in the art, the adjacent nodes of the current K node are determined by accessing an asCase list pointed to by an asCase pointer of the current K node. The asCase list contains pointers to each of the asCase nodes to be located in block 402. It will be understood by those skilled in the art that the asCase nodes located in this manner contain pointers to their Result nodes.

As shown in block 403, the Result nodes of the asCase nodes found in block 402 are determined according to their Result pointers. As shown in block 404, the Result nodes located in block 403 are then compared with the root node representing the received particle. If a match is found in decision 405 between a Result node of an asCase node found in block 402 and an elemental root node representing an input particle, the matched asCase node becomes the current K node. Therefore, the first level K pointer is advanced to point to the matched asCase node as shown in block 407.

For example, assume that the current K node determined in block 401 is the beginning of thought (BOT) node 200 in FIG. 2A. As described in block 402, the process sensor data procedure 400 determines the asCase nodes of the BOT node 200. In order to do this the asCase list of the BOT node 200 is examined. The nodes in the asCase list of the BOT node 200 are the nodes 205, 210, 215 and 220. It will thus be understood by those skilled in the art that each asCase node 205,210,215 and 220 includes a Case pointer pointing to the BOT node 200.

It will also be understood that each asCase node 205, 210, 215 and 220 includes a Result pointer pointing to its Result node. Thus, in block 403 the process, sensor data procedure 400 can determine the Result node of each node 205, 210,215 and 220 on the asCase list of the current K node by following its respective Result pointer to its respective root node. The Result nodes determined in this manner in block 403 can be compared with the elemental root node of the sensor corresponding to the received particle as shown in block 404. A determination can thus be made whether the Result node of any of the nodes 205, 210, 215 and 220 on the asCase list of the current K node match the elemental root node for the sensor of an input particle in block 404 of the process sensor procedure 400. The determination whether there is a match with the elemental root node for the sensor of the input particle can be made in decision 405.

Further to the foregoing example, the input particle in FIG. 2A can be the letter particle C and the root node 225 can correspond to the value C of the input particle. If the Result nodes of the asCase nodes 210, 215, and 220 are compared in block 404 with the root node 225 no matches are found in decision 405 because none of the asCase nodes 210,215 and 220 has a Result pointer pointing to the C elemental root node 225.

However, the asCase node 205 does contain a Result pointer pointing to the C elemental root node 225. Decision 405 of the process sensor data procedure 400 can therefore find that the Result node of the subcomponent node 205 is a match with the input particle. The current K location pointer can be set to the node +C 205, which has become the current K location of the level as shown in block 407. (For exemplary purposes in the diagrams, when the prefix notation "+" is placed before a value in a node in the figure, it indicates that the prefixed node has a valence, which will be understood to stand in for the entire thought up to but not including the prefixed node.) It will be understood that the asCase nodes of the current K node can be compared in any order and that once a match is found no more comparisons are needed.

In a different example, the current K location could be the subcomponent node 205 and the input particle could be the letter particle A. Pursuant to block 402 the asCase node of the node 205 is determined to be the subcomponent node 206. Since the Result node of the node 206 is the elemental root node representing the letter particle A, a match is found in decision 405. Thus, in block 407 the current K node is incremented to the subcomponent node 206.

Creating New Nodes

In some cases it may turn out that none of the nodes on the asCase list determined in block 402 has a Result pointer pointing to the root node of the input particle. Under these circumstances a match is not found in decision 405. Thus, it may be necessary to create new K structure as shown at block 408. The process of creating a new node is disclosed in several of the references incorporate herein, such as U.S. Pat. No.

6,961,733 and U.S. patent Ser. No. 11/185,620, entitled "Method for Processing New Sequences Being Recorded Into an Interlocking Trees Datastore" for detailed explanation of how new nodes are created. Regardless of whether execution of the process sensor data procedure 400 proceeds by way of block 407 or by way of block 408 the intensity count can be incremented as shown in block 409.

Processing Delimiters

Refer back to FIG. 3, showing the praxis procedure 300. As described in the foregoing description of the process sensor data procedure 400 of FIG. 4, when a sensor is detected by the praxis procedure 300, execution of the praxis procedure 300 can proceed by way of block 303 to process the detected sensor in the process sensor data procedure 400. However, the praxis procedure 300 may detect a delimiter particle rather than a sensor particle in an input particle stream. Under these circumstances the system and method of the invention can execute procedures suitable for processing the received delimiter.

As previously described, after comparing an input particle of data to the current list of delimiters in block 304 of the praxis procedure 300 a decision is made in decision 308 whether there is a match. If the input particle is found to match a currently defined delimiter in decision 308 the procedure of block 301 is initiated in order process the received delimiter. The procedure initiated by block 301 is the process delimiter procedure 500 of FIG. 5A. Before teaching the process delimiter procedure 500 in detail, it is important to understand what delimiters are used for in the preferred embodiment of the invention.

In the preferred embodiment of the invention delimiters are used to indicate the end of a set of particle sequences of data as they are streamed into the K Engine 11. For example, as mentioned above, in the field/record universe, data may come from traditional databases in the format of fields and records.

Figure 6A:
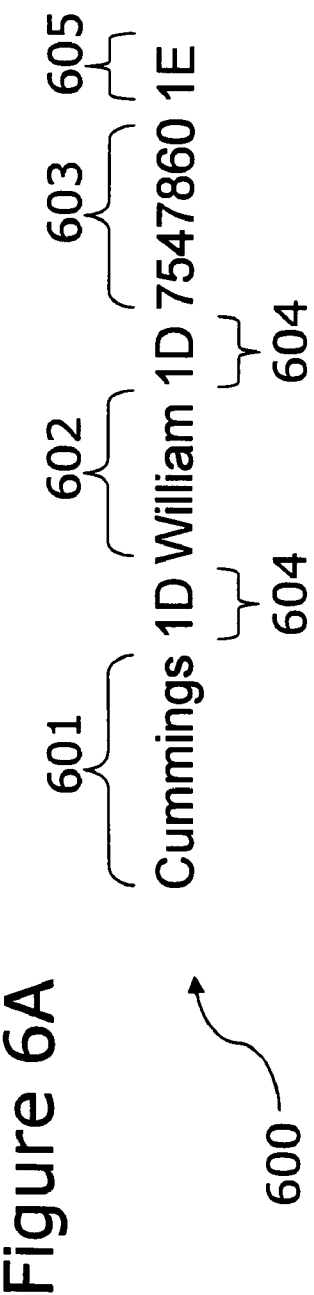
FIG. 6A is a diagram of an exemplary particle stream in a field/record universe of textual data containing a record with three fields and exemplary delimiters that separate each.

Refer to FIG. 6A showing a diagram of an exemplary particle stream 600. The exemplary particle stream 600 can represent a data record that can be stored in the K structure 14 and can therefore be referred to as the exemplary record 600. The exemplary particle stream 600 can represent three fields: Last Name 601, First Name 602, and Telephone Number 603. However, any number of fields of any size can be represented in other field/record universe particle streams, of which the exemplary particle stream 600 is but one example.

The first field in the exemplary particle stream 600 is the Last Name field 601 and is shown with the data sequence Cummings. The second field is the First Name field 602 and is shown with the data sequence William. The third field is the Telephone Number field 603 and is shown with the data sequence 7547860. At the end of the fields 601, 602 there is shown an end of field (EOF) delimiter 1D 604.

The hexadecimal character 1D 604 is thus used as an end of field delimiter for ending the first two fields 601, 602. However, the hexadecimal character 1E 605 is used as both an end of field delimiter for ending the last field 603, and an end of record delimiter for ending the exemplary record 600. As such, it is a single delimiter that ends both the field 603 and exemplary particle stream 600, and, in general, in particle streams such as the exemplary particle stream 600 a delimiter is not required for closing each level of the KStore.

Thus, significantly, the hexadecimal character 1E 605 may be used to simultaneously end both: (i) its own level in the K structure (the record level), and (ii) a lower level of the K structure (the field level). Accordingly, in the embodiment of the invention represented by the exemplary particle stream 600, each level of a particle stream is not required to have its own separate closing delimiter. Furthermore, a higher level delimiter such as the delimiter 1E can complete any number of incomplete thoughts, and thereby close any number of lower levels, in the manner that the field level of the exemplary particle stream 600 is closed.

Since textual data is not the only data that can be particlized and streamed into the K Engine 11, a more generalized explanation of delimiters may be helpful. In general, particles coming into the K Engine 11 may be thought of as incomplete thoughts which can operate cooperatively to form complete thoughts. Each incomplete thought can represent an individual particle, set of particles of data, or the absence of particles. Individual incomplete thoughts may be streamed into the K Engine 11 to form complete thoughts. This is analogous to individual fields (incomplete thoughts) such as the fields 601, 602, 603 forming a complete record (complete thought) such as the complete record 600.

Figure 6B:
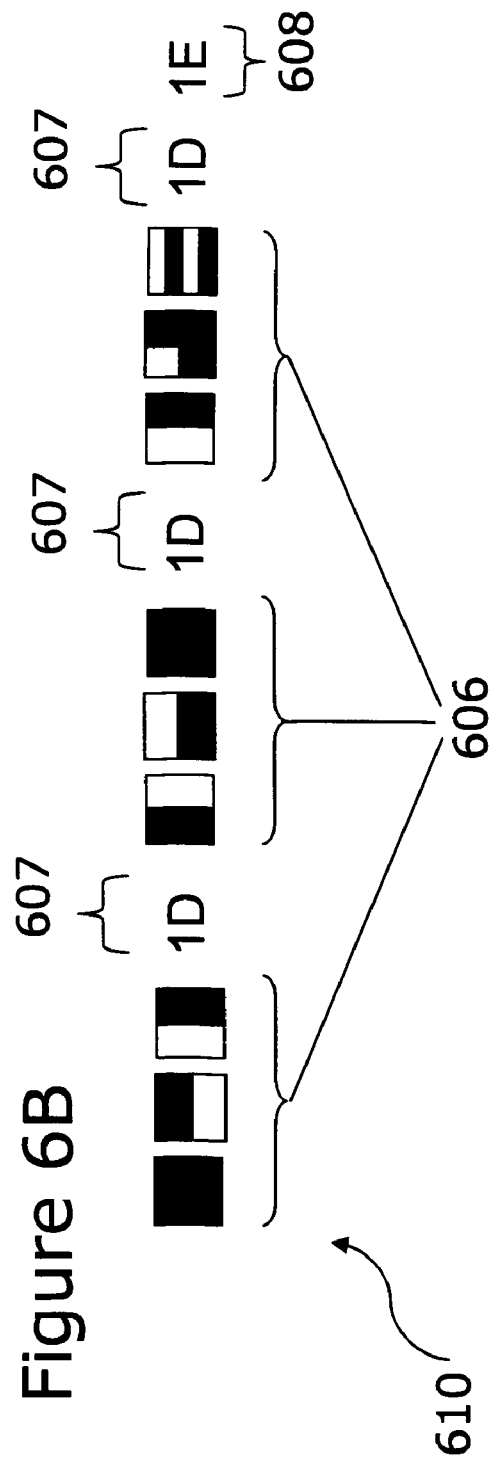
FIG. 6B shows a generalized particlized stream using pixels as the individual data particles and exemplary delimiters that separate each.

FIG. 6B shows a more generalized stream of particles with incomplete thoughts 606 making up a complete thought 610. In FIG. 6B each incomplete thought 606 is shown as groups of pixels. However, incomplete thoughts 606 could easily have been shown with textual data or data from any other data universe. In the complete thought 610 the EOT delimiter 607 is shown as the hexadecimal character 1D and the final end of product delimiter 608 is shown as the hexadecimal character 1E. This relationship is shown in FIG. 2A at the nodes 265, 282.

Although the hexadecimal characters 1D and 1E are used as delimiters 607, 608 in the illustrative examples, it will be understood that any other particle may be defined to serve as delimiters 607, 608. For example, a comma, another numerical character including characters that are not hexadecimal characters or a specific group of pixels. Thus, delimiters may be any particle that is defined as such for the praxis procedure 300 when the processing of the delimiter particles begins.

It should be noted that incomplete thoughts are not limited to single particles of data. An incomplete thought may be any sequence of data that is experienced before an EOT delimiter is experienced. An incomplete thought may also include the absence of particles indicating a null value, terminated by an EOT delimiter.

Again referring back to the praxis procedure 300 in FIG. 3, an incoming particle can be compared to a list of currently defined delimiters as shown in block 304. If the input particle matches one of the currently defined delimiters as determined in decision 308, the procedure of process delimiter block 301 can be initiated to process the received delimiter particle. The procedure for processing the received delimiter particle according to process delimiter block 301 is the process delimiter procedure 500 of FIG. 5A.

Refer now to FIG. 5A, which is a flowchart representation of the process delimiter procedure 500 for processing delimiters found in an input particle stream. The process delimiter procedure 500 can be initiated by the process delimiter block 301 of the praxis procedure 300 when a match is found between an input particle and an entry on the list of currently defined delimiters by decision 308.

As previously described, it is possible for the praxis procedure 300 to receive a higher level delimiter for completing its own level of the K structure while lower levels of K structure are still incomplete. Under these circumstances, the higher level delimiter can complete as many incomplete lower levels as necessary prior to completing its own level.

For example, refer above to the exemplary particle stream 600 shown in FIG. 6A. An EOF delimiter hexadecimal 1D 604 is shown at the ends of the fields 601, 602. The hexadecimal delimiter character 1D 604 is thus used as the delimiter for the first two fields 601,602. However, there is no delimiter character 1D 604 at the end of the field 603. Rather, only the hexadecimal delimiter character 1E 605 is shown at the end of the field 603, wherein it is understood that the level of the delimiter character 1E 605 is higher than the level of the field 603. Therefore, the received delimiter character 1E 605 is used to indicate both the end of the last field 603, and the end of the exemplary particle stream 600. Under these circumstances, the received delimiter character 605 performs both the operation of completing the incomplete thought 603, at a lower level, and the operation of ending the record 600, at a higher level.

Thus, at the time the delimiter character 605 is received: (i) the field 603 represents an incomplete thought on an incomplete lower level, and (ii) the delimiter character 605 is a delimiter for a higher level of K structure than the current level of field 603. Accordingly, the system and method of the present invention can determine both: (i) that the level of the field 603 must be completed, and (ii) that the level of the record 600 must be completed. Additionally, the system and method of the present invention can perform the operations necessary for completing both the field 603 and the record 600.

Furthermore, those skilled in the art will understand that a received delimiter can indicate the end of any number of lower levels in the manner that the delimiter character 605 indicates the end of only a single lower level. Accordingly, the system and method of the invention can perform the operations necessary for completing as many lower levels as required in addition to completing the level of the received delimiter.

Therefore, the process delimiter procedure 500 of FIG. 5A is provided to perform the operations of completing as many incomplete levels as necessary below the level of a received delimiter, as well as completing the level of the received delimiter itself. In block 501 of the process delimiter procedure 500 the level associated with the input delimiter is determined. This determination can be made according to a list of currently defined delimiters and the K location structure or state structure setting forth the corresponding delimiter level as previously described. Additionally, the variable Input Delimiter Level is set equal to the determined level in block 501.

As previously described in the current embodiment, sets of particle sequences, such as the sets of sequences forming the incomplete thoughts 606 in FIG. 6A, can be entered into the K structure 14 in levels. Thus, in effect, hierarchy is determined by the organization or location of the delimiters. For example, any number of levels may appear in a K structure and multiple types of end product nodes may be present in any one level. Refer back to FIG. 2A. The interlocking trees datastore shown in FIG. 2A includes three exemplary levels: 0, 1 and 2. An individual K structure is not limited to three levels and may contain as many as necessary. Note that the level numbers indicated in these descriptions are used for the sake of clarity of the discussion. Levels may be linked by any means desired with the concept of an "upper" level being relative to whatever linked structure is utilized. The structure used to link the levels, as discussed previously for the K location pointers or state structure, may be an array, a linked list, a K structure or any other structure known to those skilled in the art.

Level 0 (230) of the K shown in FIG. 2A can represent the elemental root nodes. For example, using field/record textual universe data of FIG. 2A, level 0 can represent the elemental root nodes 200, 225, 271, 265, or 282 as well as the other elemental root nodes that have not been provided with reference numerals in FIG. 2A.

Level 1 (235) can represent the subcomponent nodes and end product nodes of the paths 240, 245 and 250. The Result pointers of the nodes in level 1 point to the elemental root nodes in level 0.

For example, the path 240 includes the nodes 200, 205, 206, 207, 208 and 260. Assume that a delimiter for end of field, such as the delimiter 1D 265 similar to the delimiter 1D 604 in FIG. 6A, is recognized while the K location pointer for level 1 is positioned at the exemplary node 208. The nodes of the path 240 from the BOT node 200 to the node 208 thus represent an incomplete thought for the exemplary sequence BOT-C-A-T-S. The delimiter 1D 265 recognized at this point indicates the termination of the field sequence from the BOT node 200 to the node 208. Thus, an end product node 260 can be built. The addition of the end product node 260, having the EOT delimiter 1D 265 as its Result node, completes the incomplete thought, and the exemplary word CATS is thus represented by the path 240. It is the recognition of a delimiter 1D in this manner, after experiencing an incomplete thought, that completes the thought.

Level 2 (255) represents the subcomponent nodes whose Result pointers point to the complete thoughts of level 1 in FIG. 2A. The complete thoughts of level 1 are represented by the end product nodes +CATS 260, +ARE 270 and +FURRY 275. The addition of the end product node 283, having the EOT delimiter 1E 282 as its Result node, can be used to complete the incomplete thought, thus completing the record CATS ARE FURRY.

Referring back to FIG. 5A. As explained above, in block 501 of the process delimiter procedure 500 an incoming delimiter is associated with its defined level within the interlocking trees datastore and the variable Input Delimiter Level is set equal to the associated level. For example, within a field/record universe the exemplary hexadecimal character 1D 607 in FIG. 6A may be used to represent the end of a field 606 (i.e. the end of a complete field thought) as previously described. As also described, the exemplary hexadecimal character 1E may be used to represent the end of a record (i.e. the end of a complete record thought). Both of the delimiters 1D, 1E in the current embodiment may initiate processing that indicates completion of a specific level within the K structure. Thus, the level is identified with which the experienced delimiter is associated.

The process delimiter procedure 500 can next determine which, if any, levels lower than Input Delimiter Level are incomplete at the time the input delimiter is received. This determination can be made with reference to the list of the current K nodes in the K structure. As previously described, this list can contain the current K pointers for each level of the K structure. In one embodiment the K location pointer for each level can indicate the node in that level where the last event for that level was experienced, and the K location pointer for completed levels can point to any location designated as a thought beginning location. In one preferred embodiment the thought beginning location can be the BOT node 200. The process for ending the incomplete thoughts located in this manner can begin with the lowest such level as shown in block 502. Execution of the process delimiter procedure 500 can then proceed to block 503 where the process complete level procedure 550 of FIG. 5B is initiated in order to begin ending incomplete thoughts as necessary.

For example, in FIG. 2A, assume that a previous particle S 271 in the sequence BOT-C-A-T-S was the last particle sensed in level 1 (235). The sensing of the particle S 271 can permit the forming of the incomplete thought at the node 208, as previously described. At this point, the K location pointer for level 1 points to the node 208, thereby indicating that the last event experienced on level 1 (235) was at the node 208. Thus, level 1 is incomplete at this point. Therefore, level 1 is the starting level determined in block 502 of the process delimiter procedure 500 when a delimiter 1D is received. The incomplete thought +S 208 can be completed by the process complete level block 503 which initiates the process complete level procedure 550 of FIG. 5B.

Refer to FIG. 5B, which shows the process complete level procedure 550. In a preferred embodiment of the invention, the process complete level procedure 550 is initiated by the execution of block 503 of the process delimiter procedure 500 when an incomplete level is determined. The process complete level procedure 550 is adapted to complete the processing of the incomplete levels determined in block 502. The presence of unfinished lower level can be determined with reference to the table of current K node pointers of each level as previously described. The lower levels are closed starting from the lowest incomplete level and proceeding upward through the determined level.

In block 504 of FIG. 5B, the Result nodes of the asCase nodes of the current K node are compared with the determined delimiter. The process of block 504 is substantially similar to the operations of blocks 401-404 of the process sensor data procedure 400 described above. In decision 505 a decision is made whether any of the asCase nodes of the current K location for the determined current K level have a Result node that matches the root node for the determined delimiter. If no matches are found in decision 505 an end product node has not been built and processing continues to block 506. In block 506 a new end product node can be created in order to complete the incomplete thought of the determined current K level and the current K location pointer is set to the new node.

Figure 2B:
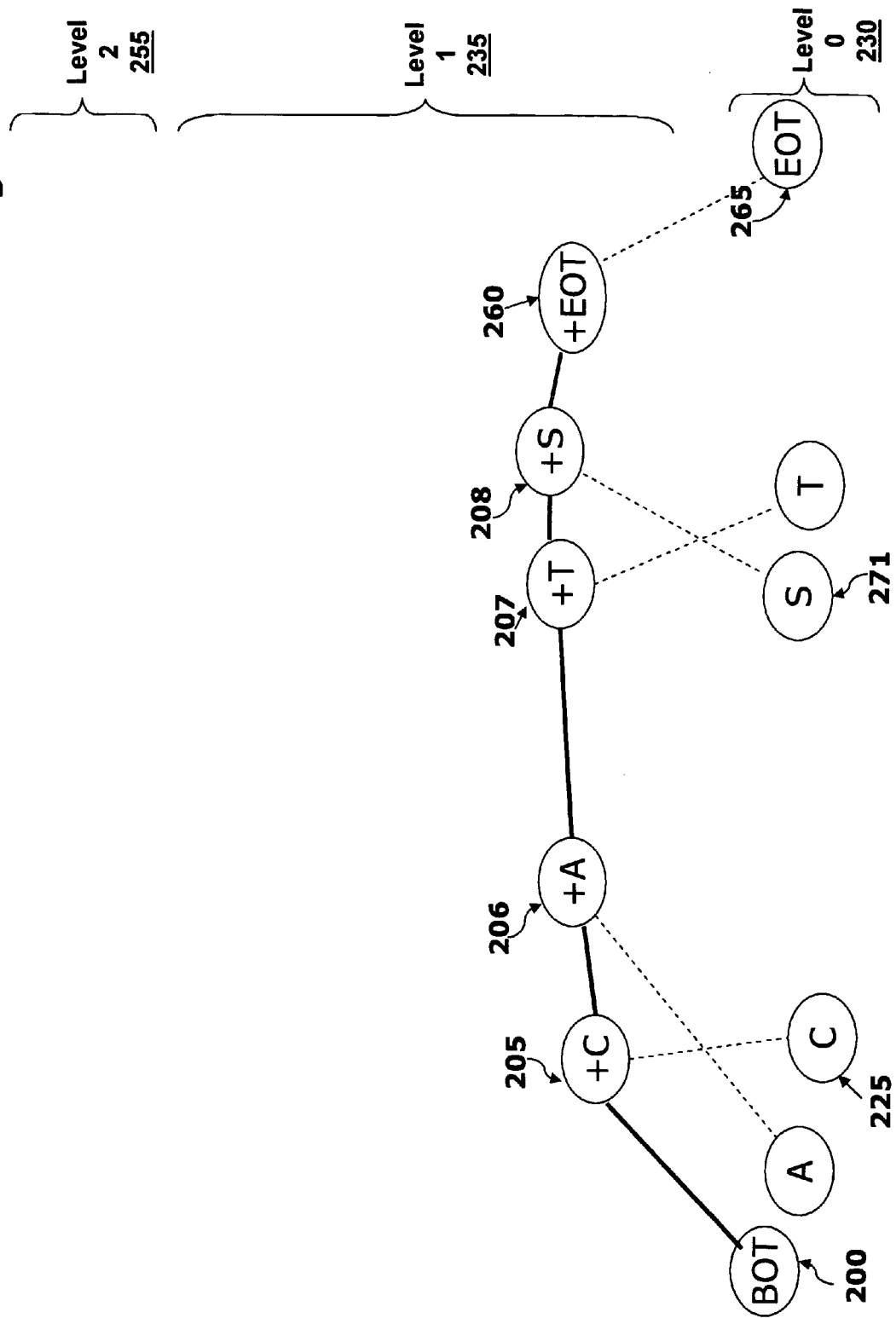
FIG. 2B is a graphical representation of a portion of the interlocking trees datastore of FIG. 2A showing a structure representing the word CATS.

Refer to FIG. 2B, which illustrates a K structure in the process of being built. In this exemplary figure, assume again that the node 208 is the last node formed and that the input particle received matched the level 1 delimiter 1D. Therefore, the K location pointer for level 1 points to the node 208. As explained above, the asCase list of the current K node 208 is checked. It is determined by decision 505 that there are no nodes in the asCase list of node 208. Therefore, processing of the process complete level procedure 550 proceeds to block 506 where the end product node 260 is created. The end product node 260 created in this manner links the node 208 to the elemental root node 265 for the field delimiter 1D for the current level which in this case is level 1. The K location pointer for level 1 is then set to the node 260 where it indicates that the level is complete. In this exemplary figure, the end product node 260 is in level 1.

In a further example of the case in which execution of the process complete level procedure 550 proceeds from decision 505 and builds a new node, assume that the current K pointer is pointing to the subcomponent node 274 of FIG. 2A when the delimiter 1D is received. If the +EOT node 275 has not previously been built the decision 505 of the process complete level procedure 550 will not find any asCase nodes. Under these circumstances processing can proceed to block 506 where the end product node 275 can be created, as described in the foregoing example.

However, when an end product asCase node of a current K node has already been experienced and built, execution of the process complete level procedure 550 can proceed from decision 505 to block 507. For example, if the field represented by the path 250 has previously been experienced by the K structure at least once, the asCase list of the node 274 is not empty.

Thus, a comparison between the Result node of the asCase node 275 and the elemental root node for the delimiter can be positive. In the current example, such a match is found because the asCase node (the node 275) of the current K node (274) does, in fact, have a Result pointer pointing to the ID delimiter sensor 265.

Thus, in this example, execution of the process complete level procedure 550 can proceed to block 507. In block 507 the previously existing node 275 can become the current K node and the count of the nodes can be incremented.

Whether execution of the process complete level procedure 550 proceeds by way of block 506 to create a new node and advance the current K pointer, or by way of block 507 to merely advance the current K pointer to a preexisting node, the count of the node is incremented and a determination is made whether there are potentially any higher levels above the current level as shown in decision 508. The determination whether there are higher levels is made by accessing the list of defined delimiters as previously described and determining where the determined delimiter is located in the defined hierarchy.

If there are no levels higher than the current K level, the K location pointer is set to the BOT node 200 to indicate that the current K level is complete as shown in block 509. The system can then wait for the next input particle. Processing by the process complete level procedure 550 is then complete. Processing can then return to the process delimiter procedure 500 in FIG. 5A and proceed from block 503 to block 511. If there is a higher level in the K structure, as determined in block 508, processing continues to the process upper level subcomponent block 510 where a subcomponent node can be built if necessary. The processing performed by the process upper level subcomponent block 510 initiates the process upper level subcomponent procedure 590 shown in FIG. 5C.

Refer to FIG. 5C, which is a flowchart representation of the process upper level subcomponent procedure 590. The process upper level subcomponent procedure 590 is initiated by process upper level subcomponent node block 510 of the process complete level procedure 500.

The upper level subcomponent procedure 590 can begin with blocks 514a-d. The operations of blocks 514a-d of the process upper level subcomponent procedure 590 are substantially similar to the operations of blocks 401-404 of the process sensor data procedure 400 described above As shown in block 514a, the current K node on the upper level can be determined. For example, referring back to FIG. 2B, the current K node on the upper level (255) can be the BOT node 200. As shown in block 514b, the asCase list of the BOT node 200 can be used to locate the asCase nodes of the BOT node 200. The node 205 is thus located. As shown in block 514c, the Result pointers of the asCase nodes of the BOT node 200 are followed to find any Result nodes. The elemental root node 225 is thus located. As shown in block 514d, the Result node located in this manner is compared with the end product node for the previous level node 260.

In decision 515 a decision is made whether any of the asCase nodes of the current K location for the current level have a Result node that matches the root node or end product node for the previous level. If there is a match the upper level K location pointer is set to the matched node as shown in block 516. However, if the end product node has not been experienced before at this level then no matches are found by decision 515 and processing continues to block 517. In block 517 a new subcomponent node can be created in the higher level and the current K location pointer for the higher level can be set to the new node.

Figure 2C:
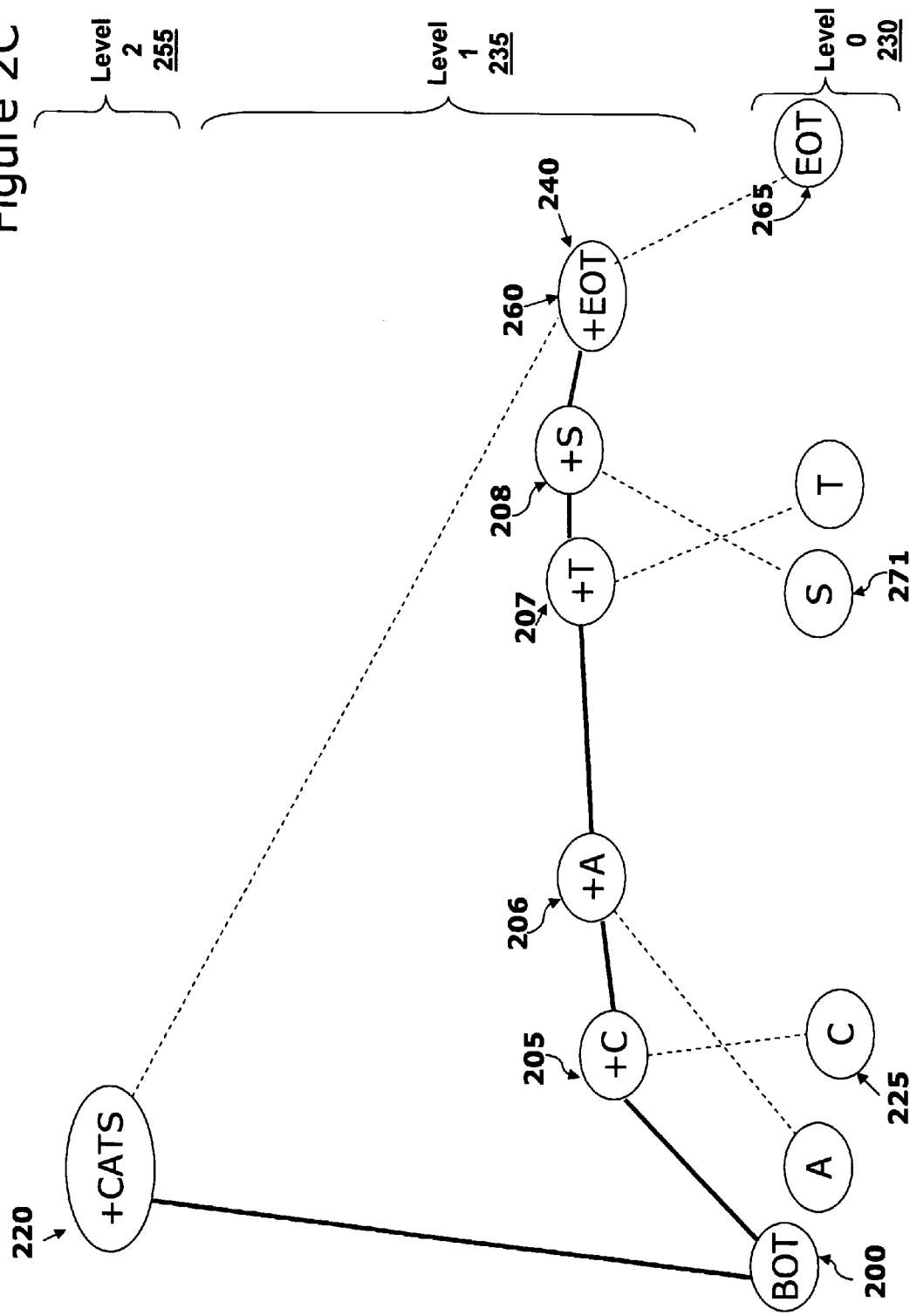
FIG. 2C is a graphical representation of a portion of the interlocking trees datastore of FIG. 2A showing a structure representing the word CATS.

For example, refer to FIG. 2C, which is a graphical representation of a portion of an interlocking trees datastore, for example, a portion of the interlocking trees datastore that was originally shown in FIG. 2A. The datastore in FIG. 2C was previously begun in FIG. 2B, as previously described. However, the datastore of FIG. 2C has an additional node, not present in the datastore of FIG. 2B, the level 2 subcomponent node 220 representing the sequence BOT-CATS. The Result node of the node 220 is the +EOT node 260 of level 1. The +EOT node 260 is the end product node of the path 240 representing BOT-C-A-T-S-EOT.

Further to FIG. 2B, the current K location for the upper level or level 2 (255), is the BOT node 200. At this point the asCase list of the BOT node 200 is checked and found to contain only one node, the node 205. The Result pointer for the node 205 is then checked and found to point to the elemental root node 225. The elemental root node 255 represents the particle C.

The elemental root node 205 thus does not match the end product node pointed to by the K location pointer for level 1, the +EOT node 260. Now refer to FIG. 2C. In FIG. 2C, a new subcomponent node may be created at the upper level (255), which in this exemplary case is the BOT-CATS node 220. The subcomponent node 220 is then set as the current K location node for the upper level. Processing then returns to FIG. 5B and proceeds from block 510 to block 509 where the current K location pointer for level 1 (235) is set to the node BOT 200. After completion of block 509 the K location pointer for level 1 points to the BOT node 200 and the K location pointer of level 2 points to the node 220. Processing can then continue to block 511 of FIG. 5A by way of calling block 503.

Processing Upper Levels

The foregoing descriptions disclose how delimiters can signal the end of complete thoughts at lower levels (e.g. field levels in a field/record data universe). The following discussion discloses how delimiters are used to signal the end of complete thoughts at upper levels (e.g. record levels in a field/record data universe). In this part of the explanation, assume that portions of an upper level have already been established.

It will be understood that to some extent the procedures for completing upper levels are similar to those for completing the lower levels as they were previously described. Therefore, where the following procedures are similar to those that have previously been taught above, the explanation may refer back to the earlier explanations. Also, the following discussion is taught using the exemplary delimiters from the field/record universe. And, before continuing, some assumptions can be made before explaining in detail how the upper level delimiters are processed.

Process Upper Level When Lower Levels are Complete

Assume in the following discussion that a K structure such as K 14 shown in FIG. 2A continues to be built. Also assume that the lower level delimiters (e.g. the 1D delimiter in the exemplary case) are experienced at the end of incomplete thoughts, thereby completing the incomplete thoughts. Also assume that eventually an upper level delimiter, e.g. 1E in a field/record universe, is experienced. Again, it should be noted that particles from a field/record universe are not the only particles that the K Engine 11 can process. Additionally, the delimiters used in the following examples (hexadecimal characters 1D and 1E) are not the only delimiters that may be used within the KStore system. Furthermore, those skilled in the art will realize that the praxis procedure 300 of the invention is not limited to field/record data, and that any data that can be digitized (e.g. pixels) may be represented as a K structure through the praxis procedure 300.

As mentioned above, the following discussion uses the K structure shown in FIG. 2A to explain the process of completing the upper levels of a K structure. As the following discussion begins, refer to FIG. 2A and assume the following about each level.

Level 0 (230)—Contains all of the elemental root nodes of the K Store 14.

Level 1 (235)—The paths 240, 245, and 250 are complete. The K location pointer for level 1 points to the BOT node 200.

Level 2 (255)—The sequences that can be represented by the subcomponent nodes 220, 280, and 281 have been processed and the K location pointer for the level 2 points to the node 281.

As the following discussion begins, the next particle that is experienced is the delimiter 1E, wherein the delimiter 1E closes its own level (level 2) as shown in the exemplary particle string 610 of FIG. 6A.

As explained above, the praxis process 300 shown in FIG. 3 begins in block 304 by determining whether the received particle is a currently defined delimiter. Since the particle is a delimiter, execution proceeds to the process delimiter procedure 500 of FIG. 5A by way of block 301 of FIG. 3.

Refer back to the process delimiter procedure 500 in FIG. 5A, which is a flowchart representation of a procedure for processing delimiters. Since in the example the received hexadecimal character 1E is defined to represent an end of record, it is known that this delimiter is associated with level 2 (255) by accessing the delimiter level data or state structure as shown in block 501. The process shown in block 502 determines that the lowest incomplete level is level 2 (255) because the K location pointer for level 1 (235) is at BOT node 200.

Again, as explained above in detail, the process complete level procedure 550 shown in FIG. 5B is initiated by way of block 503. The procedure steps shown in blocks 504, 505 and 506 are completed and the end product node +EOT 283 is created in block 506 and set as the K location pointer for level 2. When the procedure 550 reaches block 508, a determination is made whether there are any potentially higher levels within the KStore. In the exemplary case, no other higher level delimiters are defined beyond the hexadecimal character 1E. Thus, there are no other higher levels in the K. Therefore, the K location pointer for level 2 (255) is set to the BOT node 200 as shown in FIG. 2A and block 509 of FIG. 5B.

From block 509, the process complete level procedure 550 returns to the calling block 510 in FIG. 5A and proceeds to block 511. In block 511 the level is set to the next upper level. Since there is no level higher than this one, the current level is set to a value larger than the maximum level, in this case level 3. In blocks 512 the current level is compared to the Input Delimiter Level and in block 513 of the procedure 500 determines whether the current level is greater than the level of the input delimiter. In the example, the input delimiter is at level 2. Since level 3 is greater than level 2, the question in decision block 513 is answered YES, indicating completion of the delimiter processing in the procedure 500. Execution can then return to block 303 of the praxis procedure 300 in FIG. 3. At this point the praxis procedure 300 can return to its calling procedure, block 301, where the system awaits the next incoming particle.

Process Upper Level When Lower Levels are not Complete

Assume in the following discussion that a K structure such as K 14 shown in FIG. 2A continues to be built. Also assume that the last lower level delimiter (e.g. the 1D delimiter in the exemplary case) has not yet been experienced at the end of the last incomplete thought. Also assume that eventually an upper level delimiter, e.g. 1E in a field/record universe, is experienced. Again, it should be noted that particles from a field/record universe are not the only particles that the K Engine 11 can process. Additionally, the delimiters used in the following examples (hexadecimal characters 1D and 1E) are not the only delimiters that may be used within the KStore system. Furthermore, those skilled in the art will realize that the praxis procedure 300 of the invention is not limited to field/record data, and that any data that can be digitized (e.g. pixels) may be represented as a K structure through the praxis procedure 300.

As mentioned above, the following discussion uses the K structure shown in FIG. 2A to explain the process of completing the upper levels of a K structure. As the following discussion begins, refer to FIG. 2A and assume the following about each level.

Level 0 (230)—Contains all of the elemental root nodes of the KStore 14.

Level 1 (235)—The paths 240 and 245 are complete. Within the path 250, the sequences that can be represented by the nodes 215,216, 272, 273 and 274 have been experienced, and the K location pointer for level 1 points to the node 274.

Level 2 (255)—The sequences that can be represented by the subcomponent nodes 220 and 280 have been processed and the K location pointer for the level 2 points to the node 280.

As the following discussion begins, the next particle that is experienced is the delimiter 1E, wherein the delimiter 1E closes both its own level (level 2) and the level below it (level 1) as shown in the exemplary particle string 600 of FIG. 6A. Thus, in general, in particle streams such as the exemplary particle stream 600 a delimiter is not required for closing each level of the KStore.

As explained above, the praxis process 300 shown in FIG. 3 begins in block 304 by determining whether the received particle is a currently defined delimiter. Since the particle is a delimiter, execution proceeds to the process delimiter procedure 500 of FIG. 5A by way of block 301 of FIG. 3.

Refer back to the process delimiter procedure 500 in FIG. 5A, which is a flowchart representation of a procedure for processing delimiters. Since in the example the received hexadecimal character 1E is defined to represent an end of record, it is known that this delimiter is associated with level 2 (255) by accessing the delimiter level data or state structure as previously described. The process shown in block 502 determines that the lowest incomplete level is level 1 (235) because the K location pointer for level 1 (235) is not at BOT node 200. Rather, it points to the subcomponent node 274 of the K path 250 within level 1 (235) in the current example. It is also determined from the delimiter level data or state structure that the delimiter for level 1 is 1D.

As explained above, the process delimiter procedure 500 can proceed by way of block 503 to initiate the process complete level procedure 550 of FIG. 5B, in order to complete the incomplete lower level 1 (235) of the K before processing the upper level (255). The level, level 1, and the determined delimiter, 1D, are passed to the process complete level procedure. In block 504 the asCase node of the K location pointer for this level (level 1), node 274, if any, is located. If the +EOT node 275 has already been created there is a match in decision 505 between its Result node 265 and the determined delimiter, wherein it is understood that the determined delimiter 1D is the delimiter associated with level 1 (235). The current K node for level 1 is advanced to point to the +EOT node 275 in block 507 and the intensity is incremented.

If the +EOT node 275 has not already been created, there is no end product node and no match in decision 505. The process complete level procedure 550 can then proceed to block 506 where the +EOT node 275 can be created. Since the new node is to be located on level 1(235) the Result node of the new +EOT node 275 is set to EOT 1D 265.

The procedure 550 can increment the count and proceed to decision 508 where a determination can be made whether there are any higher levels. Because there is a level above level 1 (235), namely level 2 (255), the process upper level subcomponent procedure 590 of FIG. 5C is initiated by way of block 510.

As the process upper level subcomponent procedure 590 of FIG. 5C is initiated by way of block 510 of FIG. 5B, the procedures in blocks 514a-d are performed. In these operations the asCase nodes, if any, of the current K node (the node 280) of level 2 (255) can be located. The Result nodes of any asCase nodes located can be compared to the end product node for the previous level. In the current example the asCase node 281 can be located. The Result node of the asCase node 281 is compared with the end product or root node of the previous level or node 275. Since node 275 matches the K location pointer for the previous level, the K location pointer for the upper level or level 2 is set to node 281 representing "BOT-CATS-ARE-FURRY", as shown in FIG. 2A. If there had been no match a new subcomponent node would have been created in block 517 and the current K location for level 2 advanced to the newly created node. The process returns to FIG. 5B block 509, at which point the K location pointer for level 1 is set to BOT. The process then returns to FIG. 5A block 511.

The current level is then set to the next highest level in block 511 of the process delimiter procedure 500. In the current example the next highest level is delimiter level 2 (255). This is the record level in the field/record universe of data of the current example. As shown in block 512 of the process delimiter procedure 500 the new level is compared to the variable Input Delimiter Level of block 501. In the example, the input delimiter is 1E, which represents level 2 (235), and the current K level is also level 2 (235). In the decision block 513 a determination is made whether the current K level is greater than the variable Input Delimiter Level. Since both level numbers are 2 in the current example the answer to decision 513 is NO. The process delimiter procedure 500 can therefore proceed from the decision 513 by way of the process complete level block 503 to the process complete level procedure 550 of FIG. 5B to complete the processing for level 2 (255).

Again, as explained above in detail, the process complete level procedure 550 shown in FIG. 5B is initiated. The procedure steps shown in blocks 504, 505 and 506 are completed and the end product node +EOT 283 is set as the K location pointer for level 2. When the procedure 550 reaches block 508, a determination is made whether there are any potentially higher levels within the KStore. In the exemplary case, no other higher level delimiters are defined beyond the hexadecimal character 1E. Thus, there are no other higher levels in the K. Therefore, the K location pointer for level 2 (255) is set to the BOT node 200 as shown in FIG. 2A and block 509 of FIG. 5B.

From block 509, the process complete level procedure 550 returns to the calling block 510 in FIG. 5A and proceeds to block 511. In block 511 the level is set to the next upper level.

Since there is no level higher than this one, the current level is set to a value larger than the maximum level or, in this case, level 3. In blocks 512 the current level is compared to the Input Delimiter Level and in block 513 of the procedure 500 determines whether the current level is greater than the level of the input delimiter. In the example, the input delimiter is at level 2. Since level 3 is greater than level 2, the question in decision block 513 is answered YES, indicating completion of the delimiter processing in the procedure 500. Execution can then return to block 303 of the praxis procedure 300 in FIG. 3. At this point the praxis procedure 300 can return to its calling procedure, block 309, where the system can await the next incoming particle.

The invention claimed is:

1. A method for processing a particle stream in a KStore interlocking tree datastore having a sensor level of elemental root nodes and a first level above said sensor level, said particle stream having a plurality of input particles, comprising:
   receiving at least one particle within said particle stream to provide a received particle;
   first determining a current K node to determine a partial sequence location;
   second determining a match in accordance with said received particle and said current K node to provide a match determination; and
   processing said current K node based upon said match determination;
   wherein the KStore interlocking trees datastore comprising a plurality of nodes, and a K node of the plurality of nodes comprises a Case pointer and a Result pointer, said Case pointer and said Result pointer pointing to two nodes from which the K node is formed, the K node also comprising pointers to an asCase array and an asResult array, the asCase array comprising pointers to nodes whose Case pointers point to said K node and wherein the asResult array comprises pointers to nodes whose Result pointers point to said K node.

2. The method for processing a particle stream in a KStore of claim 1, further comprising creating a new node if said second determining is negative.

3. The method for processing a particle stream in a KStore of claim 2, further comprising setting a current K node to said new node.

4. The method for processing a particle stream in a KStore of claim 2, further comprising incrementing a node count.

5. The method for processing a particle stream in a KStore of claim 1, further comprising determining a particle type of said received particle.

6. The method for processing a particle stream in a KStore of claim 5, further comprising determining that said particle type is a delimiter.

7. The method for processing a particle stream in a KStore of claim 6, further comprising determining a match between said delimiter and a Result node of an asCase node of said current K node to provide a delimiter match determination.

8. The method for processing a particle stream in a KStore of claim 7, further comprising creating an end product node if said delimiter match determination is negative.

9. The method for processing a particle stream in a KStore of claim 8, further comprising setting said current K node to a sequence beginning location.

10. The method for processing a particle stream in a KStore of claim 9, wherein said sequence beginning location comprises a beginning of thought location.

11. The method for processing a particle stream in a KStore of claim 7, further comprising setting said current K node to beginning of sequence if said delimiter match determination is positive.

12. The method for processing a particle stream in a KStore of claim 7, further comprising incrementing a node count.

13. The method for processing a particle stream in a KStore of claim 5, further comprising determining that said particle type is a sensor data particle.

14. The method for processing a particle stream in a KStore of claim 13, further comprising determining a match between said sensor data particle and a Result node of an asCase node of said current K node to provide a sensor data match determination.

15. The method for processing a particle stream in a KStore of claim 14, further comprising creating new subcomponent node if said sensor data match determination is negative.

16. The method for processing a particle stream in a KStore of claim 15, further comprising setting said current K node to said new subcomponent node.

17. The method for processing a particle stream in a KStore of claim 14, further comprising setting said current K node to matched subcomponent node if said delimiter match determination is positive.

18. The method for processing a particle stream in a KStore of claim 14, further comprising incrementing a node count.

19. The method for processing a particle stream in a KStore of claim 1, wherein said K Store includes a state data structure for storing a current K node to indicate a partial sequence location.

20. The method for processing a particle stream in a KStore of claim 19, wherein said received particle is a reset state structure indicator.

21. The method for processing a particle stream in a KStore of claim 20, wherein said reset state structure indicator is a null particle.

22. The method for processing a particle stream in a KStore of claim 20, wherein said current K node within said state structure is reset to sequence begin indicator.

23. The method for processing a particle stream in a KStore of claim 22, wherein said current K node within said state structure is reset to a begin of sequence node.

24. The method for processing a particle stream in a KStore of claim 19, wherein said first determining comprises accessing said state data structure.

25. The method for processing a particle stream in a KStore of claim 19, further comprising determining whether said received particle is included in said state data structure.

26. The method for processing a particle stream in a KStore of claim 24, further comprising determining said current K node in accordance with said state data structure.

27. The method for processing a particle stream in a KStore of claim 19, wherein said state data structure comprises a delimiter list.

28. The method for processing a particle stream in a KStore of claim 19, wherein said state data structure comprises a list of sensors.

29. The method for processing a particle stream in a KStore of claim 28, wherein said state data structure comprises a delimiter list.

30. The method for processing a particle stream in a KStore of claim 1, further comprising providing a list of particles.

31. The method for processing a particle stream in a KStore of claim 30, wherein said second determining comprises determining whether said received particle is included in said a list of particles.

32. The method for processing a particle stream in a KStore of claim 31, further comprising performing no further operations with said received particle if a said received particle does not match any particle on said list of particles.

33. The method for processing a particle stream in a KStore of claim 1, wherein said current K node has an adjacent K node that is adjacent to said current K node and said second determining comprises locating said adjacent node in accordance with an asCase list of said current K node to provide a located asCase node.

34. The method for processing a particle stream in a KStore of claim 33, wherein said asCase list includes a plurality of asCase nodes further comprising locating a plurality of adjacent nodes in accordance with said asCase list.

35. The method for processing a particle stream in a KStore of claim 34, wherein said match determination comprises determining a Result node of said located asCase node to provide a located Result node.

36. The method for processing a particle stream in a KStore of claim 35, wherein said second determining comprises comparing said located Result node with said received particle.

37. The method for processing a particle stream in a KStore of claim 36, further comprising creating a new node if said second determining is negative.

38. The method for processing a particle stream in a KStore of claim 37, further comprising setting a current K node to said new node.

39. The method for processing a particle stream in a KStore of claim 36, further comprising performing no further operations if said second determining is negative and if a learn functionality of said KStore is disabled and a Result node of said located asCase node does not match said received particle.

40. The method for processing a particle stream in a KStore of claim 36, further comprising incrementing a node count.

41. The method for processing a particle stream in a KStore of claim 36, further comprising setting a current K node to said matched node.

* * * * *